(12) United States Patent
Momose et al.

(10) Patent No.: US 9,090,144 B2
(45) Date of Patent: Jul. 28, 2015

(54) AUTOMOTIVE AIR CONDITIONING SYSTEM

(75) Inventors: Kensuke Momose, Shizuoka (JP); Hideki Hashigaya, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 324 days.

(21) Appl. No.: 13/545,351

(22) Filed: Jul. 10, 2012

(65) Prior Publication Data

US 2013/0020046 A1    Jan. 24, 2013

(30) Foreign Application Priority Data

Jul. 20, 2011    (JP) ................. 2011-158810

(51) Int. Cl.
*G01M 1/38* (2006.01)
*B60H 1/00* (2006.01)

(52) U.S. Cl.
CPC .................. *B60H 1/00428* (2013.01)

(58) Field of Classification Search
CPC .................................................. B60H 1/00428
USPC ...................... 700/276; 320/104, 132; 701/22
See application file for complete search history.

(56) References Cited

U.S. PATENT DOCUMENTS

| | | | |
|---|---|---|---|
| 5,275,012 A * | 1/1994 | Dage et al. ....................... 62/208 |
| 2002/0113576 A1* | 8/2002 | Oomura et al. ................ 320/134 |
| 2010/0206957 A1* | 8/2010 | Vyas et al. ................... 236/46 R |

FOREIGN PATENT DOCUMENTS

| | | |
|---|---|---|
| CN | 101025104 A | 8/2007 |
| JP | 4-88301 U | 7/1992 |
| JP | 11-240329 A | 9/1999 |
| JP | 2006-290244 A | 10/2006 |
| JP | 2009-83567 A | 4/2009 |

OTHER PUBLICATIONS

Notification of First Office Action mailed May 29, 2014 in corresponding CN Application No. 201210253534.6, filed Jul. 20, 2012 (with an English translation) (11 pages).
Notification of Completion for Formalities of Registration mailed Feb. 5, 2015 in corresponding Chinese Patent Application No. 201210253534.6 (with an English translation) (4 pages).
Notice of Allowance mailed Jun. 2, 2015 in corresponding Japanese Patent Application No. 2011-158810 (1 page).

* cited by examiner

*Primary Examiner* — Sean Shechtman
*Assistant Examiner* — Chad Rapp
(74) *Attorney, Agent, or Firm* — Rothwell, Figg, Ernst & Manbeck, P.C.

(57) ABSTRACT

An air conditioning system for a passenger compartment of an electric vehicle has a battery unit that is chargeable by supply of electric power from an external power source. The system includes a charge-level detection section to detect a charge level of the battery unit and an HEV controller has an integrated control of the whole of an electric vehicle including an air conditioner. Before a preparatory air-conditioning operation for air conditioning in the passenger compartment during charge, the HEV controller grants permission to enter air conditioning in the passenger compartment if the battery charge level is greater than a predetermined level. The HEV controller adjusts an amount of electric power usable for air conditioning in the passenger compartment based on a change in the charge level.

5 Claims, 9 Drawing Sheets

FIG. 6

| ΔSOC[%] | -10 or less | -9 | -8 | ... | -1 | 0 | 1 | ... | 8 | 9 | 10 or more |
|---|---|---|---|---|---|---|---|---|---|---|---|
| ELECTRIC POWER ADDITIONAL AMOUNT W1 [W] | -a10 | -a9 | -a8 | ... | -a1 | 0 | b1 | ... | b8 | b9 | b10 |

DECREASING ⇓    INCREASING ⇑

AUTOMOTIVE AIR CONDITIONING SYSTEM

RELATED APPLICATIONS

The present application claims priority to Japanese Patent Application No. 2011-158810 filed on Jul. 20, 2011, the entire contents of which are being incorporated herein by reference.

TECHNICAL FIELD

The present invention relates to conditioning air in vehicles and more particularly to conditioning air in an electric vehicle during charge.

BACKGROUND ART

There are known a battery or pure electric vehicle (EV) which uses one or more electric traction motors and a hybrid electric vehicle (HEV) which combines an internal combustion engine propulsion system with an electric propulsion system. These vehicles derive all their electric power from their large capacity rechargeable battery units for power supply to traction motors and air conditioners for air conditioning in their passenger compartments. In some electric vehicle, an improvement in convenience of driving is made by charging its battery unit during regenerative braking and by restoring the battery unit to full charge with an external battery charger.

It is known from Patent Document 1 to practice so-called preparatory air conditioning (AC) operation in which, in order to maintain comfort during driving an electric vehicle after charge to restore its battery unit, the temperature and other conditions of its passenger compartment are adjusted to maintain comfort. By performing the preparatory AC operation during charge, the amount of electric power consumed for air conditioning in the passenger compartment can be saved during driving, resulting in an appreciable extension of driving range between charges in addition to improved comfort in the passenger compartment. The above-mentioned Patent Document 1 proposes performing the preparatory AC operation at a reserved time on condition that the battery charge level (State of Charge: SOC) is greater than or equal to a predetermined level.

PRIOR ART DOCUMENT

Patent Document

Patent Document 1: JP utility model publication No. 04-88301

SUMMARY OF THE INVENTION

Problem to be Solved

However, if the preparatory AC operation is performed using the amount of electric power exceeding the amount of charged electric power, the battery charge level falls to shorten driving (cruising) range between charges because the preparatory AC operation is performed with electric power used during charge.

In the case a battery charger is supplied with a portion of electric power available for each family, an amount of electric power consumed by the preparatory AC operation may exceed the amount of electric power supplied to the battery charger, increasing the possibility that the charge level (state of charge abbreviated as SOC) of the battery unit may fall to shorten the driving range between charges. Thus, in the case the preparatory AC operation is to be performed during charge, attention must be paid to the amount of electric power consumed by the family.

Therefore, there is a need for an automotive air conditioning system which ensures that, during charge, the preparatory AC operation is easy to work.

Solution to the Problem

According to a first embodiment of the present invention, there is provided an air conditioning system for air-conditioning an interior of a passenger compartment of a motor vehicle, the system equipped within the vehicle with a battery unit that is chargeable by supply of electric power from an external power source, the external power source being external to the motor vehicle, the system comprising: an air-conditioning control unit configured to adjust air temperature in the passenger compartment during charge of the battery unit; an SOC detection unit configured to detect a state-of-charge (SOC) of the battery unit; an air-conditioning grant unit configured to permit air conditioning in the passenger compartment if the SOC that is detected by the SOC detection unit is greater than a predetermined SOC; a SOC change acquisition unit configured to acquire a change amount in the SOC that is detected by the SOC detection unit; and a power adjustment unit configured to adjust an amount of electric power usable for air conditioning in the passenger compartment based on the change amount in the SOC acquired by the SOC change acquisition unit.

According to a second embodiment, in the system according to the above-mentioned first embodiment, the system according to claim 1, wherein the air-conditioning control unit sets one of an air-cooling unit configured to cool air in the passenger compartment and air-heating unit configured to heat air in the passenger compartment to work based on a detection result by an interior air temperature sensor configured to detect air temperature in the passenger compartment.

Advantageous Effects of the Invention

The first embodiment allows air conditioning during charge while securing a charge level required for normal driving using electric power from the battery unit after charge by detecting a charge level of the battery unit during charge, permitting air conditioning in the passenger compartment if the charge level is greater than a predetermined level and adjusting an amount of electric power usable for air conditioning in the passenger compartment based on the change in the charge level. This avoids a reduction in the charge level (remaining battery charge) of the battery unit which would otherwise would occur in spite of expectations that the battery unit is being charged if the air conditioning is turned on during charge, ensuring comfortable environment by regulating air temperature in the passenger compartment before driving the vehicle upon completion or interruption of the charge.

The second embodiment can avoid concurrence of air cooling and air heating by setting one of the air cooling and air heating to work. Therefore, it is possible to condition air in the passenger compartment with minimum electric power consumption without using electric energy from the battery unit too much.

BRIEF DESCRIPTION OF THE DRAWINGS

FIG. 6 is a table illustrating the calculation of a preset value for adjusting the amount of electric power supply to work the air conditioning.

DESCRIPTION OF EMBODIMENTS

Figure 1:
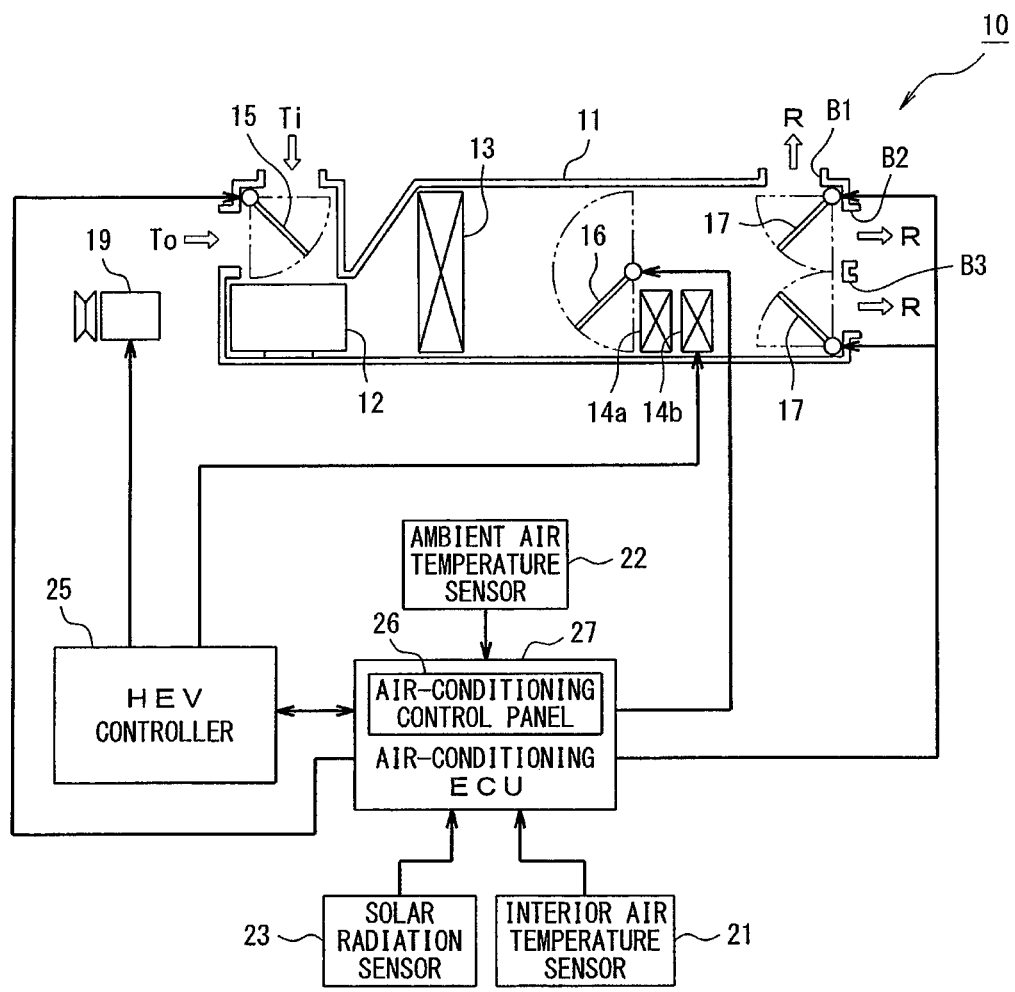
FIG. 1 is a diagrammatic illustration of an automotive air conditioning system according to one exemplary embodiment.

Referring to the drawings, an embodiment of the present invention is described in detail. FIGS. 1 to 9 show an automotive air conditioning system according to one embodiment.

With reference to FIG. 1, the automotive air conditioning system 10 is, in particular, a heating, ventilation, and air conditioning (HVAC) system for conditioning environment of a passenger compartment R of a vehicle or electric vehicle with an internal combustion engine, so-called a hybrid electric vehicle (HEV), by performing a heating, cooling, dehumidification, or ventilation function.

The air conditioning system 10 includes a blower in the form of a blower fan (a blower) 12, an evaporator (a cooling unit) 13, a heater core 14a and an auxiliary heater (a heating unit) 14b, an inlet damper (recirculation door) 15, a air-mixing damper (blend door) 16, an outlet damper (mode damper) 17, a passenger compartment (interior air) temperature sensor (a passenger compartment temperature measuring unit) 21, an ambient or outside air temperature sensor (an ambient or outside air temperature detecting unit) 22, a solar radiation sensor (a solar radiation detecting unit) 23, a hybrid electric vehicle (HEV) controller 25 and an air-conditioning (AC) electronic control unit (ECU) 27.

The blower fan 12 draws air into a duct 11 such that air enters the duct 11 from the upstream side and flows toward the downstream side to form flow of air. The evaporator 13 absorbs heat energy from air that flows through the duct 11. The heater core 14a and auxiliary heater 14b heat air that flows through the duct 11. The inlet damper 15 switches an air passage to which the blower fan 12 intakes within the duct 11 to fresh outside air inlet (fresh outside air passage) $T_o$ or interior air inlet (interior air passage) $T_i$. The air-mixing damper 16 controls a portion of air passing in the duct 11 such that it flows over a passage contacting with the heater core 14a and auxiliary heater 14b. The outlet damper 17 selectively switches an air passage blown from the duct 11 to any one of duct outlets B1, B2 and B3 provided in the passenger compartment R. The passenger compartment or interior air temperature sensor 21 senses actual temperature in the passenger compartment R (hereinafter referred to as "interior air temperature"). The ambient air temperature sensor 22 senses ambient air temperature outside the passenger compartment R. The solar radiation sensor 23 senses the quantity of solar light received by the passenger compartment R of the vehicle. The HEV controller 25 controls various function components including the blower fan 12, evaporator 13, auxiliary heater 14b and the like. The air-conditioning ECU 27 monitors the sensors 21, 22 and 23 and various settings selected by manipulating an air-conditioning (AC) control panel 26 and controls the opening and closing operation of the various dampers 15, 16 and 17.

In the air conditioning system 10, the HEV controller 25 and AC ECU 27 cooperate with each other to bring the actual passenger compartment R temperature in conformance with desired temperature. The HEV controller 25 functions as a controller of temperature of air discharged into the passenger compartment R and the AC ECU 27 forms a desired air-flow structure by controlling supply of current to drive motors, not illustrated, for each of dampers 15, 16 and 17.

The evaporator 13 allows entry of refrigerant flow regulated by a thermal expansion valve that receives high pressure refrigerant liquid from a condenser, not shown, where refrigerant gas from a motor-driven compressor 19 condenses and serves as a heat absorption component absorbing large amounts of heat when refrigerant evaporates. This evaporator 13 is located in the duct 11 to cool air passing (contacting with) the evaporator fins.

The heater core 14a located in the duct 11 allows hot coolant from the vehicle's engine to pass through a winding tube to heat air forced to pass fins attached to the tube. The auxiliary heater 14b is a Positive Temperature Coefficient (PTC) ceramic heater. The PTC heater 14b is energized by turning on electricity to heat air that flows through the duct 11 and serves as an auxiliary heating unit when the vehicle engine stops, but it is turned off after the vehicle engine has been started because the heater core 14a becomes effective to heat air during operation of the vehicle engine.

The HEV controller 25 has an integrated control of the whole of an electric vehicle including an internal combustion engine. According to the integrated control, in order to realize that the electric vehicle runs efficiently, the HEV controller 25 coordinates the engine control with the motor control in accordance with control programs, various kinds of parameters and the like, which are prepared beforehand, based on various kinds of settings and information obtained by monitoring various sensors. In addition, the HEV controller 25 charges the regenerative battery unit, not illustrated, with electric energy regenerated by setting the electric motor to work as a generator during regenerative braking while the electric vehicle is travelling.

Figure 2:
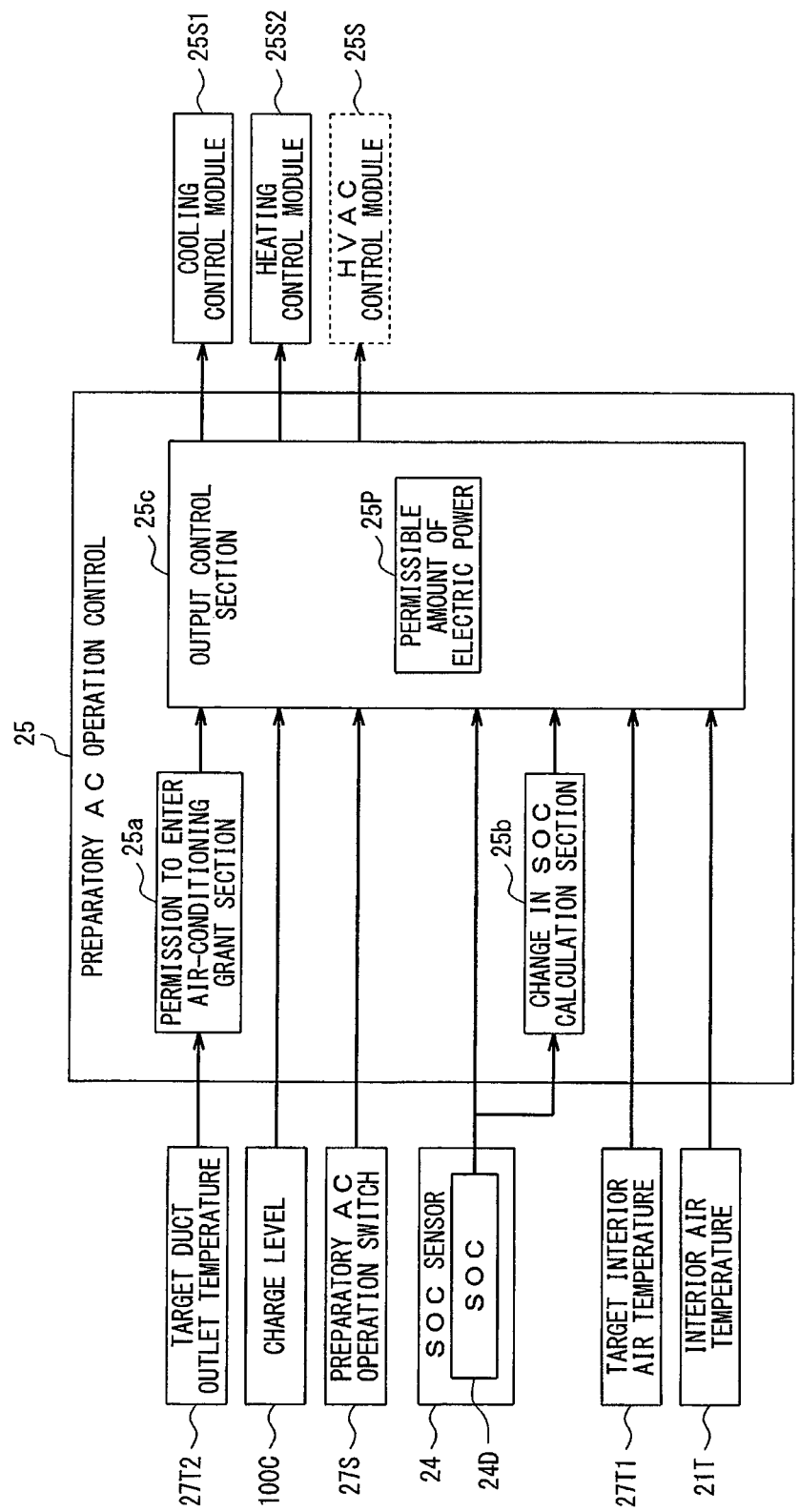
FIG. 2 is a block diagram illustrating the exchange of information during air conditioning.

This HEV controller 25 has various kinds of control including start & stop engine control and on & off motor control. In addition to such control, the HEV controller 25 plays a role of a control section for the air conditioning system 10 by executing a HVAC control module 25S to perform the function of heating, cooling, dehumidifying, or ventilating the passenger compartment R as shown in FIG. 2. In addition to the HVAC control module 25S, the HEV controller 25 monitors a State-of-Charge (SOC) sensor (SOC detection unit) 24 that is configured to detect SOC of the rechargeable battery unit and provides a charge request to an instrument panel, not shown, when a current level of SOC 24D is below a minimum target level of SOC, making the vehicle driver hurry to charge the rechargeable battery unit.

The HEV controller 25 then performs so-called preparatory air-conditioning (AC) operation in accordance with the position (ON or OFF) of a preparatory AC operation switch 27S which is selected by setting the AC control panel 26. According to the preparatory AC operation, receiving a control signal from a normal battery charger currently installed in each family as charging facility for EV vehicles to get information about a charge level 100C for the battery charger as indicated by the control signal, the HEV controller 25 brings the actual air temperature in the passenger compartment R in compliance with the target air temperature (target interior air temperature) 27T1 that is selected by setting the AC control panel 26.

In addition, the HEV controller 25 performs the function attached to a permission to enter air-conditioning grant determination unit 25a for making a decision whether permission to enter the preparatory AC operation should be granted or rejected depending on a target duct outlet temperature 27T2 and the function attached to a change in SOC calculation unit 25b for calculating the change per unit time in SOC 24D obtained by monitoring the SOC sensor 24. It is noted here that the target duct outlet temperature 27T2 is a target temperature which is determined by the AC ECU 27 based on the interior air temperature 21T that is obtained by monitoring the interior air temperature sensor 21.

The HEV controller 25 performs the function attached to an output control section 25c. The output control section 25c receives various kinds of information from the permission to enter air-conditioning grant determination unit 25a and change per unit time in SOC calculation unit 25b and executes a cooling control module 25S1 or a heating control module 25S2 while calculating the permissible amount of electric power 25P usable to set the blower fan 12, motor driven compressor 19e for evaporator 13, auxiliary heater 14b and so on to operate during the preparatory AC operation. While the present embodiment has been described and will be described taking, as an example, the case where the chargeable battery unit is connected to a normal battery charger as an external power source outside the electric vehicle, it is not intended that this example illustrates and describes all possible forms of this embodiment. It is understood that the case where an EV quick charger is used instead of the normal battery charger falls in various changes that may be made without departing from the sprit and scope of the present embodiment.

Figure 3:
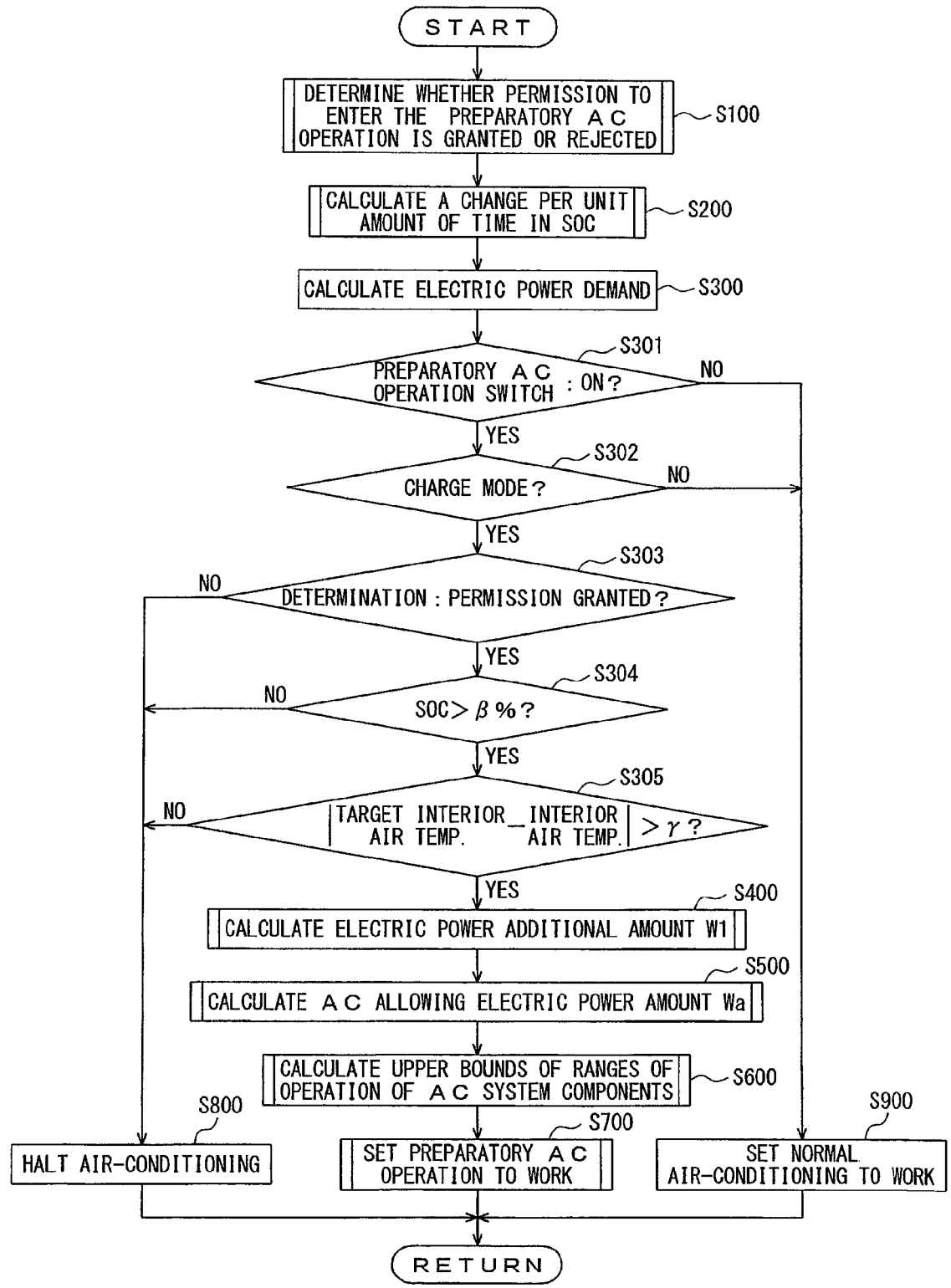
FIG. 3 is a flowchart illustrating the procedure of determining conditions for advanced preparation for air conditioning.

Specifically, the HEV controller 25 is configured to make decision whether permission to enter the preparatory AC operation should be granted or rejected, to calculate a change in SOC and to calculate or obtain permissible amount of electric power usable during the preparatory AC operation and performs a procedure (a method) for the preparatory AC operation as illustrated by the flowchart of FIG. 3.

First, while the AC system is being controlled, the HEV controller 25 repeats the execution of a permission granting job to determine whether permission to enter the preparatory AC operation is granted or rejected (step S100), the execution of a change in SOC calculating job to calculate a change per unit amount of time in SOC (step S200) and the execution of a electric power demand calculating job to calculate an electric power demand by the AC system in normal mode to bring the actual interior air temperature in compliance with the target interior air temperature 27T1 (step S300).

Figure 4:
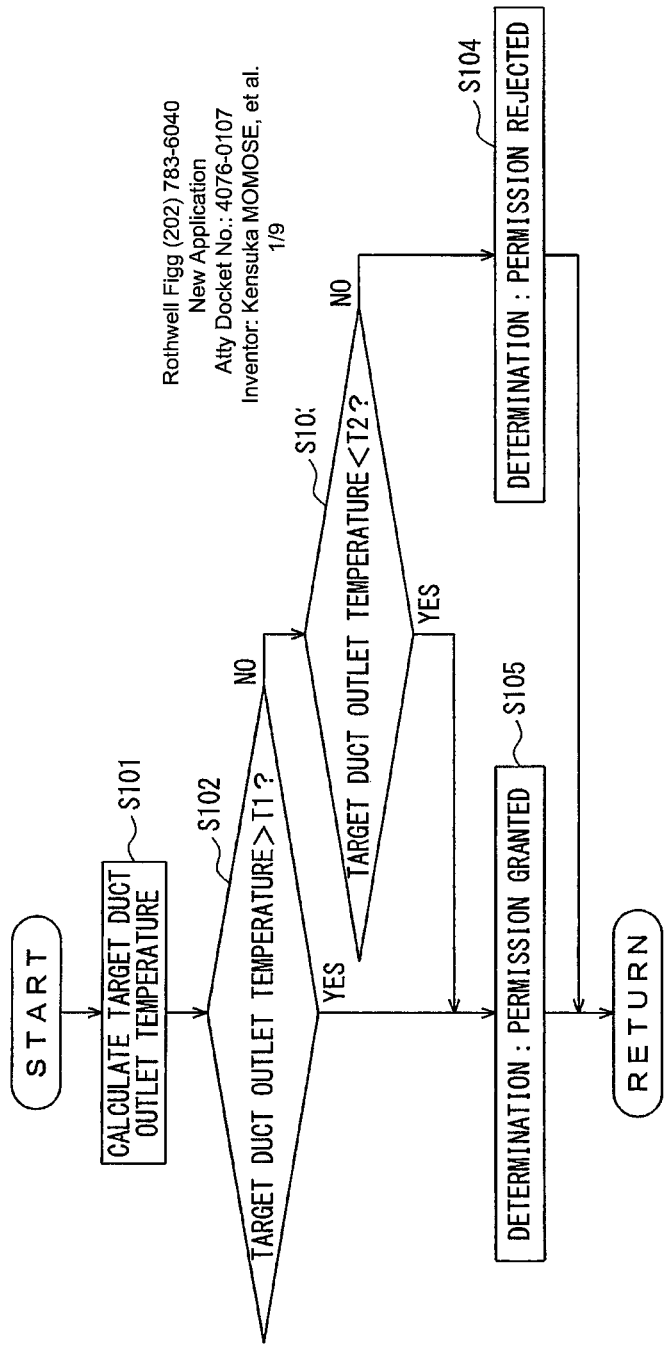
FIG. 4 is a flowchart illustrating the procedure of approving or disapproving a decision to permit air conditioning in response to a need for air conditioning.

At step S100, the HEV controller 25 follows steps shown in FIG. 4 and calculates a target duct outlet temperature of air conditioned by cooling by the evaporator 13 or heating by the heater core 14a or auxiliary heater 14b and discharged from at least one of the duct outlets B1, B2 and B3 based on the (actual) interior air temperature 21T and the target interior air temperature 27T1 (step S101). Next, the HEV controller 25 determines whether or not the target duct outlet temperature is in excess of a predetermined temperature criterion of air-heating T1 (step S102). If it does not find that the target duct output temperature is in excess of the predetermined temperature criterion of air-heating T1, the HEV controller 25 finds whether or not the target duct outlet temperature is below a predetermined temperature criterion of air-cooling T2 (step S103). If it does not determine that the target duct outlet temperature is below the predetermined temperature criterion of air-cooling T2, the HEV controller 25 sets a determination that permission to enter the preparatory AC operation is rejected (step S104) because there is no need for air conditioning in the passenger compartment R when the relation that T1≥the target duct outlet temperature≥T2 holds.

On the other hand, the HEV controller 25 sets a determination that permission to enter the preparatory AC operation is granted (step S105) if it determines at step S102 that the target duct outlet temperature is in excess of the predetermined temperature criterion of air-heating T1 and there is a need for air heating in the passenger compartment R or if it determines at step S103 that the target duct outlet temperature is below the predetermined temperature criterion of air-cooling T2 and there is a need for air cooling in the passenger compartment R.

It is understood that any appropriate temperature, for example, 30° C., may be set as the temperature criterion of air heating T1 as long as it undoubtedly causes a need for air heating in the passenger compartment R. Any appropriate temperature, for example, 20° C., may be set as the temperature criterion of air cooling T2 as long as it undoubtedly causes a need for air cooling in the passenger compartment R. The determination that the permission is granted may be made available for later use by setting a decision Flag=1. On the other hand, the determination that the permission is rejected may be made available for later use by resetting the decision Flag=0.

Figure 5:
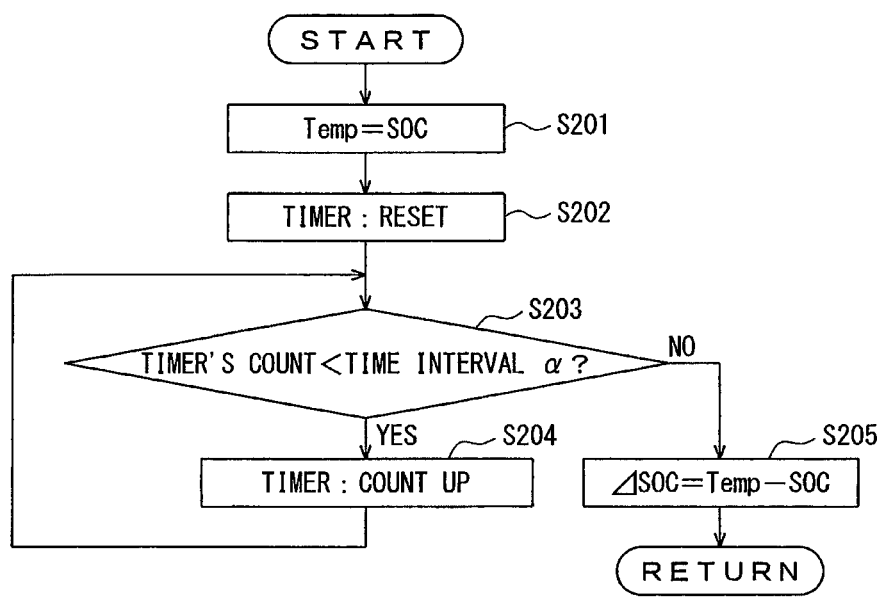
FIG. 5 is a flowchart illustrating the procedure of calculating the rate of change in state of charge of the rechargeable battery unit in response to a need for approving or disapproving the decision to permit air conditioning.

At step S200, the HEV controller 25 performs the function attached to the change in SOC calculation section 25b by following steps shown in FIG. 5. First, the HEV controller 25 obtains a current level of SOC, as represented at 24D in FIG. 2, detected by the sensor SOC 24 and temporarily saves the current level of SOC on temporary data named Temp (step S201). Next, the HEV controller 25 stops its built-in timer to reset to zero (at step S202), determines whether or not the timer counts up to a predetermined time interval α (step S203) and sets the timer to count up if the timer does not count up to the predetermined time interval α yet (step S204). On the other hand, if it determines that the timer has counted up to the predetermined time interval α, the HEV controller 25 calculates the amount of change in SOC of the chargeable battery unit ΔSOC by subtracting a current level of SOC (denoted in FIG. 2 by 24D) detected by the SOC sensor 24 from the temporary data Temp and temporarily stores the calculation result (step S205).

With respect to the electric power demand by the air conditioning system which is calculated by the HEV controller 25 at step S300, the HEV controller 25 may calculate or set, as the electric power demand, the electric power required for carrying out normal air conditioning or in other words the power consumption per unit time consumed for air conditioning until the target interior air temperature 27T1 is reached. Thus, no further description is made.

Returning next to FIG. 3, the HEV controller 25 determines whether the preparatory AC operation is set ON or NOT (step S301) as represented by the AC front panel 26 switch setting, allows the procedure to advance to step S900 if it does not determine that the preparatory AC operation is set ON and sets the normal air conditioning to operate.

Even if, at step S301, it determines that the preparatory AC operation is set ON, the HEV controller 25 allows the procedure to advance to step S900 and sets the normal air conditioning to operate if it finds out that the battery unit is not in charge mode after determining whether or not the battery is being charged with power supply from an external battery charger (step S302).

On the other hand, if, at step S302, it finds out that battery unit is in charge mode, the HEV controller 25 determines that the permission to enter the preparatory AC operation is granted or in other words the decision Flag is set, i.e., Flag=1, (step S303). If it does not determine that the permission is granted, i.e., the permission is rejected and the decision Flag is reset (i.e., Flag=0), the HEV controller 25 allows the procedure to advance to step S800 to process to halt air conditioning. It is understood that the determination at step S100 that the permission is granted sets the decision Flag=1 based on the recognition that air conditioning in the passenger compartment R is needed.

This causes the HEV controller 25 to avoid putting the preparatory AC operation to work in a useless manner under circumstances where air conditioning in the passenger compartment R is not needed, thus enabling efficient and accelerated battery charge without any reduction in battery SOC and any drop in charging efficiency.

Even if, at step S303, it determines that the permission is granted (i.e., the decision Flag=1), the HEV controller 25 still performs the function attached to the permission to enter air-conditioning grant section and determines whether or not a current level of SOC, as represented at 24D in FIG. 2, detected by the SOC sensor 24 is in excess of a predetermined ratio to full charging capacity $\beta$ % (step S304). If it does not determine that the current level of SOC is in excess of the predetermined ratio of full charging capacity $\beta$%, the HEV controller 25 allows the procedure to advance to step S800 to process to halt air conditioning because the battery SOC is below the necessary charging level high enough to get the basic functions of the electric vehicle including driving active.

This causes the HEV controller 25 to avoid carrying on the preparatory AC operation till such a situation where a level of battery SOC is below the predetermined ratio of full charging capacity $\beta$% that is regarded as the minimum necessary level of battery SOC, thus enabling efficient and accelerated battery charge without any reduction in battery SOC and any drop in charging efficiency.

It is worth mentioning here, as air-conditioning settings, that the HEV controller 25 permits supply of current to only the auxiliary heater 14b during the preparatory AC operation described later upon determining the permission to enter the preparatory AC operation based on the fact that the target outlet duct temperature is in excess of the temperature criterion of air heating T1. On the other hand, the HEV controller 25 permits supply of current to only the evaporator 13 and motor-driven compressor 19 during the preparatory AC operation upon determining the permission to enter the preparatory AC operation based on the fact that the target outlet duct temperature is below the temperature criterion of air cooling T2. This causes the HEV controller 25 to avoid unnecessary increase in consumption of electric power otherwise caused due to simultaneous activation of the evaporator 13 and auxiliary heater 14b in a situation when the passenger compartment R is unoccupied, enabling efficient air conditioning with the lowest consumption level of electric power.

The predetermined ratio of full charging capacity $\beta$%, to which the current value of SOC is compared, as represented at 24D in FIG. 2, may be set to any value by manipulating the AC control panel 26. For example, at the time of factory setting, the predetermined ratio of full charging capacity $\beta$ % is set after assuming the lowest necessary level of SOC for normal driving, but it may be set according to user's usages, including the frequency of activating air conditioning during driving, in real situations. This can avoid an event that renders the preparatory AC operation inoperable to assure the battery SOC more than needed, facilitating the use of the preparatory AC operation to prepare air conditioned environment in the passenger compartment R.

Even if, at step S304, it determines that the current level of SOC, as represented at 24D in FIG. 2, is in excess of the predetermined ratio to full charging capacity $\beta$%, the HEV controller 25 determines whether or not the absolute value of a subtraction of the actual interior air temperature 21T that is detected by the interior air temperature sensor 21 from the target interior air temperature 27T1 that is represented by setting the AC control panel 26 (temperature difference) is in excess of a predetermined value y (step S305). If it does not determine that the subtraction is in excess of the predetermined value y, the HEV controller 25 allows the procedure to advance to step S800 to process to halt air conditioning because the temperature in the passenger compartment R is too well to be air conditioned.

This causes the HEV controller 25 to avoid putting the preparatory AC operation to work if the detected interior air temperature 21T in the passenger compartment R is not considerably deviated from the target interior air temperature 27T1, thus enabling efficient and accelerated battery charge without any reduction in battery SOC and any drop in charging efficiency.

On the other hand, if, at step S305, it determines that the subtraction of the detected interior air temperature 21T in the passenger compartment R from the target interior air temperature 27T1 is in excess of the predetermined value y, the HEV controller 25 performs the function attached to the power adjusting section and starts the processing to calculate an amount of electric power usable for the preparatory AC operation with the processing to calculate an amount of electric power that may be added, called an "electric power additional amount W1" (step S400).

At step S400, the HEV controller 25 determines the electric power additional amount W1 that is added to an amount of electric power permitted for use to drive the AC equipment by referring to a computer-readable table shown in FIG. 6 (called an "electric power additional amount map") using as a key value the amount of a change in SOC of the chargeable battery unit ($\Delta$SOC %) which has been determined at step S200. For example, the HEV controller 25 sets 0 W as the electric power additional amount W1 when $\Delta$SOC is 0% indicating that there is no change in the battery SOC in order to continue supply of electric power to perform air conditioning in the passenger compartment R with little or no reduction in the battery SOC maintained during charge. The HEV controller 25 sets a negative value ranging from –a1 watts to –a10 watts as the electric power additional amount W1 when $\Delta$SOC ranges from to less than –10% indicating that the battery SOC shows a tendency to decrease in order to increase the strength of electric power used to charge the battery unit. The HEV controller 25 sets a positive value ranging from b1 watts to b10 watts as the electric power additional amount W1 when $\Delta$SOC ranges from 1% to more than 10% indicating that the battery SOC shows a tendency to increase in order to put a portion of electric power used to charge the battery unit to activation of equipment for air conditioning in the passenger compartment R. Here, FIG. 6 shows the variation in amount of electric power.

This causes the HEV controller 25 to avoid a reduction in the battery SOC owing to consumption of stored electric energy in the battery unit by air conditioning even if the battery unit is being charged by adjusting the variation of a later described amount of electric power Wa that is allowed to be used to activate equipment for air conditioning, called an "AC allowing electric power amount Wa", in response to change in the battery SOC.

Subsequently, the HEV controller 25 calculates the AC allowing electric power amount Wa, which is usable for air conditioning in the passenger compartment R, with the electric power additional amount W1 added (step S500).

Figure 7:
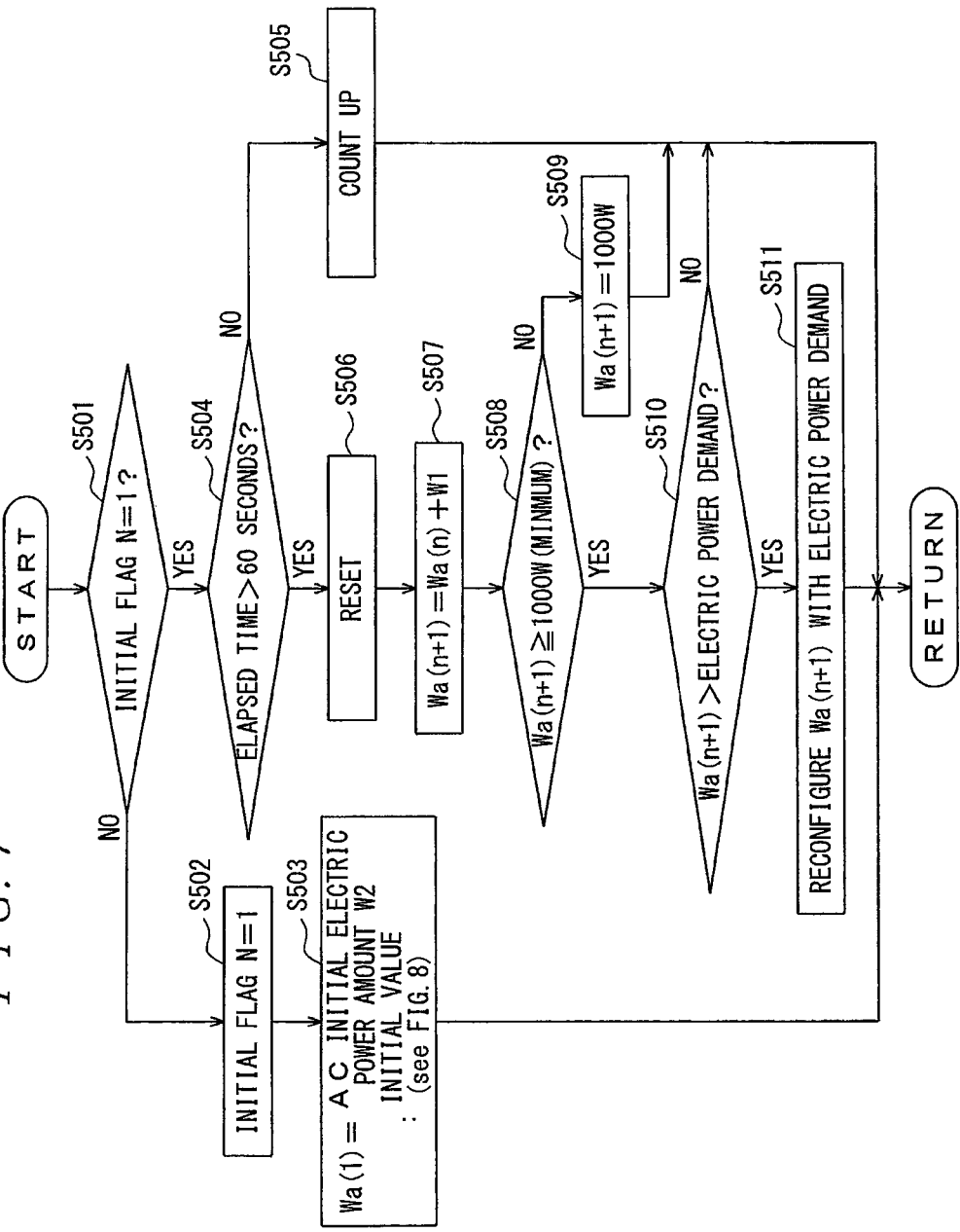
FIG. 7 is a flowchart illustrating the procedure of calculation of the amount of permissible power to work the air conditioning.
Figure 8:
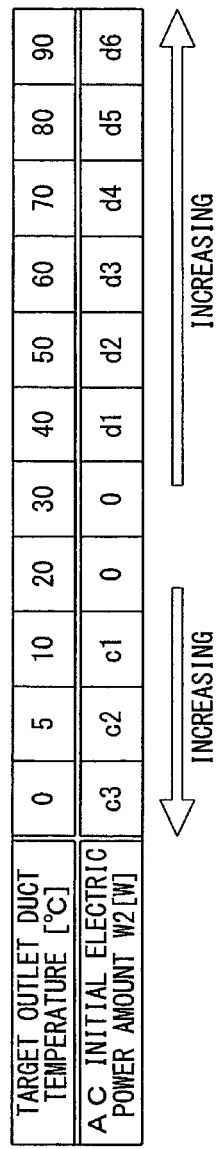
FIG. 8 is a table illustrating the setting for the initial permissible power to work the air conditioning.

At step S500, referring to FIG. 7, firstly, the HEV controller 25 confirms whether or not the initial processing to calculate an initial value for the AC allowing electric power amount Wa has been completed by checking whether or not the state for an initial flag N is set to 1 (step S501). Next, after setting the state for the initial flag N to 1 (step S502) if it does not determine the state for the initial flag N=1, the HEV controller 25 calculates an initial amount of electric power W2 that is allowed to be used for air conditioning in the passenger compartment amount R, called an "AC initial electric power amount W2", by referring to a computer-readable table shown in FIG. 8 (called an "AC initial electric power amount map") using as a key value the target duct outlet temperature and temporarily sets the result as the AC allowing electric power amount Wa1) (step S503). For example, the HEV controller 25 sets 0 W as the AC initial electric power amount W2 when the target outlet duct temperature ranges from 20° C. to 30° C., which has been calculated at step S101 as temperature of air to be discharged from the duct outlets B1, B2 and B3, indicating that there is no need for air conditioning in the passenger compartment R. When the target outlet duct temperature ranges from 30° C. to 90° C., the HEV controller 25 sets a value ranging from d1 watts to d6 watts in accordance with the target outlet duct temperature as the AC initial electric power amount W2 required for supplying electric current to the auxiliary heater 14b to perform air-heating. When the target outlet duct temperature ranges from 0° C. to less than 20° C., the HEV controller 25 sets a value ranging from c3 watts to c1 watts in accordance with the target duct outlet temperature as the initial electric power amount W2 required for supplying electric current to the evaporator 13 to perform air-cooling. Here, FIG. 8 shows the variation in the absolute value of amount of electric power.

Next, if, at step S501, it determines that the initial electric power amount W2 is set (as represented by the initial flag N=1), the HEV controller 25 determines whether or not elapsed time that counts up by its built-in timer is in excess of 60 seconds (at step S504) in order to repeat calculation of the AC allowing electric power amount Wa(n+1) at 60-second intervals. If, here, it does not determine that the elapsed time is in excess of 60 seconds, the HEV controller 25 allows the procedure to return to step S501 to repeat similar processing after setting its built-in timer to count up (step S505). Note, n is a natural number.

If, at step 504, it determines that a 60-second interval has passed since the last calculation of the AC allowing electric power amount Wa (n+1), the HEV controller 25 resets the count of its timer (step S506) and updates the AC allowing electric power amount Wa(n+1) using the following formula that includes the last calculated value Wa(n) of the AC allowing electric power amount and the electric power additional amount W1 (step S507).

$$Wa(n+1)=Wa(n)+W1$$

where, Wa (n+1) is the AC allowing electric power amount; Wa(n) is the last calculated value of the AC allowing electric power amount; and W1 is the electric power additional amount.

This causes the HEV controller 25 to keep the preparatory AC operation working with an appropriate amount of electric power by serial processing to adjust the AC allowing electric power amount Wa by repeating adjustment (increase or decrease) using the electric power additional amount W1 that varies with the battery charge level.

Next, the HEV controller 25 determines whether or not the calculated AC allowing electric power amount Wa(n+1) is greater than or equal to a value required to keep the air conditioning system 10 working, for example, 1000 watts, (step S508), and sets the value of the AC allowing electric power amount Wa (n+1) to 1000 watts (step S509) to ensure that the air conditioning system 10 continues to work if it determines that the calculated AC allowing electric power amount Wa(n+1) is less than 1000 watts.

On the other hand, if it determines that the AC allowing electric power amount Wa(n+1) is greater than or equal to 1000 watts, the HEV controller 25 determines whether or not the AC allowing electric power amount Wa(n+1) is in excess of the electric power demand that has been calculated at step S300 (step S510). If, here, it does not determine that it is in excess of the electric power demand, the HEV controller 25 allows the procedure to return to step S501 to repeat the same processing. If it determines that it is in excess of the electric power demand, indicating that unnecessary AC allowing electric power amount is secured, the HEV controller 25 reconfigure the content of the AC allowing electric power amount Wa(n+1) with the electric power demand (step S511) before returning to step S501 to repeat the same processing.

This causes the HEV controller 25 to determine the appropriate AC allowing electric power amount Wa(n+1) as an electric power amount required to operate the air conditioning system 10, allowing the preparatory AC operation to work without any reduction in charge level of the battery unit, enabling adjustment of air temperature within the passenger compartment R to a comfortable level.

Turning back to FIG. 3, the HEV controller 25 sets the upper bounds of the ranges of operation of components of the air conditioning system 10 after it has calculated the AC allowing electric power amount Wa(n+1) (step S600).

Figure 9:
FIG. 9 is a table illustrating the setting for restrictions on drive of various components needed to work the air conditioning.

At step 600, the HEV controller 25 calculates the upper bounds in accordance with the AC allowing electric power amount Wa(n+1) by referring to the table shown in FIG. 9 (called an "upper bound map") in order to keep, for example, the motor driven compressor 19 and auxiliary heater 14b working within the ranges not exceeding the calculated upper bounds. For example, when it sets 0 W as the AC allowing electric power Wa(n+1) and selects the air-cooling at step S100, the HEV controller 25 sets 0 rpm as the upper bound of the range of speeds of the battery driven compressor 19 because the air conditioning is not necessary, and sets "en rpm" (where, n is a natural number) as the upper bound for every 500 watts from 1000 watts that is the necessary minimum for operating air conditioning. When it sets 0 watt as the AC allowing electric power Wa (n+1) and selects the air-heating at step S100, the HEV controller 25 sets 0 stage as the upper bound of the range of stages of the auxiliary heater 14b because the air conditioning is not necessary, and sets "fn stage" (where, n is a natural number) as the upper bound for every 500 watts from 1000 watts that is the necessary minimum for operating the air conditioning.

After setting such various conditions, the HEV controller 25 sets the preparatory AC operation to work by supplying the AC allowing electric power amount Wa(n+1) of power to the air conditioning system 10 from the battery unit (step S700).

This causes the HEV controller 25 to set the air conditioning system 10 to work with the optimum amount of electric power variable in accordance with variation in amount of change in the battery charge level, enabling adjustment of air temperature in the passenger compartment R by efficiently performing the preparatory AC operation. In this situation, since there is no supply of excessively great power to the air conditioning system 10, it is no longer necessary to pay much attention to the supply amount of electric power during charge even if a normal battery charger set in each family is used to charge the battery unit.

In the previously described manner, it is possible to set the preparatory AC operation to work with the AC allowing electric power amount Wa that is variable in accordance with variation in the charge level of the battery unit, so that the range between charges may not be shortened caused due to a reduction in the battery charge level. It follows that the preparatory AC operation is set to work efficiently, and after the completion of charge, the diver can get in a comfortable passenger compartment R and drive the vehicle.

The embodiment has being described, as one example, the case in which the preparatory AC operation is set to work during charge using electric power from a normal battery charger, but it is not limited to this example. As another modification to the embodiment, a fast battery charger may be used to charge the battery unit using a sufficient amount of electric power and, for example, the fast battery charger may be used to charge a plurality of electric vehicles concurrently.

The embodiment has been described, as one example, the case the HEV controller 25 controls the preparatory AC operation, but the AC ECU 27 may control the preparatory AC operation. In addition, the preparatory AC operation may be set to work a predetermined time period before a scheduled time for departure after the battery charge level becomes greater than a predetermined charge level. In the example, the PTC ceramic heater is used for air-heating, but other air-heating function such as a heat pump system may be installed for air-heating. Further, the target duct outlet temperature is used in the example to determine whether or not the permission to enter the air conditioning is granted, but the interior air temperature may be used to determine whether or not the permission to enter the air conditioning is granted. In the example, the engine-electric hybrid vehicle is used, but a battery electric vehicle (EV) may be used.

It is not intended to limit the scope of the present invention to the exemplary embodiment. All other embodiments which provide equivalent technical effects to those by the invention are intended to come within the sprint and scope of the invention. It is not intended to limit the scope of the invention to combination(s) of various features defined in appended claims. The scope of the invention is intended to encompass any desired combination(s) of at least some of all various features disclosed in the description.

INDUSTRIAL APPLICABILITY

While embodiments and modifications have been described, it is not intended that they illustrate and describe all possible forms of the invention. Rather, it is understood that various changes may be made without departing from the spirit and scope of the invention.

REFERENCE SIGNS LIST

10 air conditioning system
11 duct
12 blower fan
13 evaporator
14a heater core
14b auxiliary heater
15 inlet damper
16 air-mixing damper
17 outlet damper
19 motor-driven compressor
21 interior air temperature sensor
22 ambient air temperature sensor
23 solar radiation sensor
25 HEV controller
25a air-conditioning grant determination unit
25b change in SOC calculation unit
26 air-conditioning control panel
27 air-conditioning electronic control unit (AC ECU)
100 charger
R passenger compartment

The invention claimed is:

1. An air conditioning system for air-conditioning an interior of a passenger compartment of a motor vehicle, the system equipped within the vehicle with a battery unit that is chargeable by supply of electric power from an external power source, the external power source being external to the motor vehicle, the system comprising:
    an air-conditioning control unit configured to adjust air temperature in the passenger compartment during charge of the battery unit;
    an SOC detection unit configured to detect a state-of-charge (SOC) of the battery unit;
    an air-conditioning grant unit configured to permit air conditioning in the passenger compartment if the SOC that is detected by the SOC detection unit is greater than a predetermined SOC;
    a SOC change acquisition unit configured to acquire a change amount in the SOC that is detected by the SOC detection unit; and
    a power adjustment unit configured to adjust an amount of electric power usable for air conditioning in the passenger compartment based on the change amount in the SOC acquired by the SOC change acquisition unit.

2. The system according to claim 1, wherein the air-conditioning control unit sets one of an air-cooling unit configured to cool air in the passenger compartment and air-heating unit configured to heat air in the passenger compartment to work based on a detection result by an interior air temperature sensor configured to detect air temperature in the passenger compartment.

3. The system according to claim 1, wherein the SOC change acquisition unit is configured to acquire a change per unit of time of the SOC detected by the SOC detection unit.

4. The system according to claim 3, wherein the power adjustment unit updates the amount of power usable after a predetermined amount of time has elapsed since a last adjustment.

5. The system according to claim 1, wherein the air-conditioning control unit determines whether the battery unit is in a charge mode, and if the battery unit is in a charge mode, the air-conditioning grant unit does not permit air conditioning where the detected SOC is less than a predetermined percentage of fully charged capacity.

* * * * *